Oct. 19, 1965   O. M. SURBER   3,212,480
COOLING OF RADIANT FURNACE TUBE SUPPORTS
Filed June 10, 1963   3 Sheets-Sheet 1

INVENTOR.
O.M. SURBER
BY Young and Quigg
ATTORNEYS

INVENTOR.
O. M. SURBER

BY Young and Quigg

ATTORNEYS

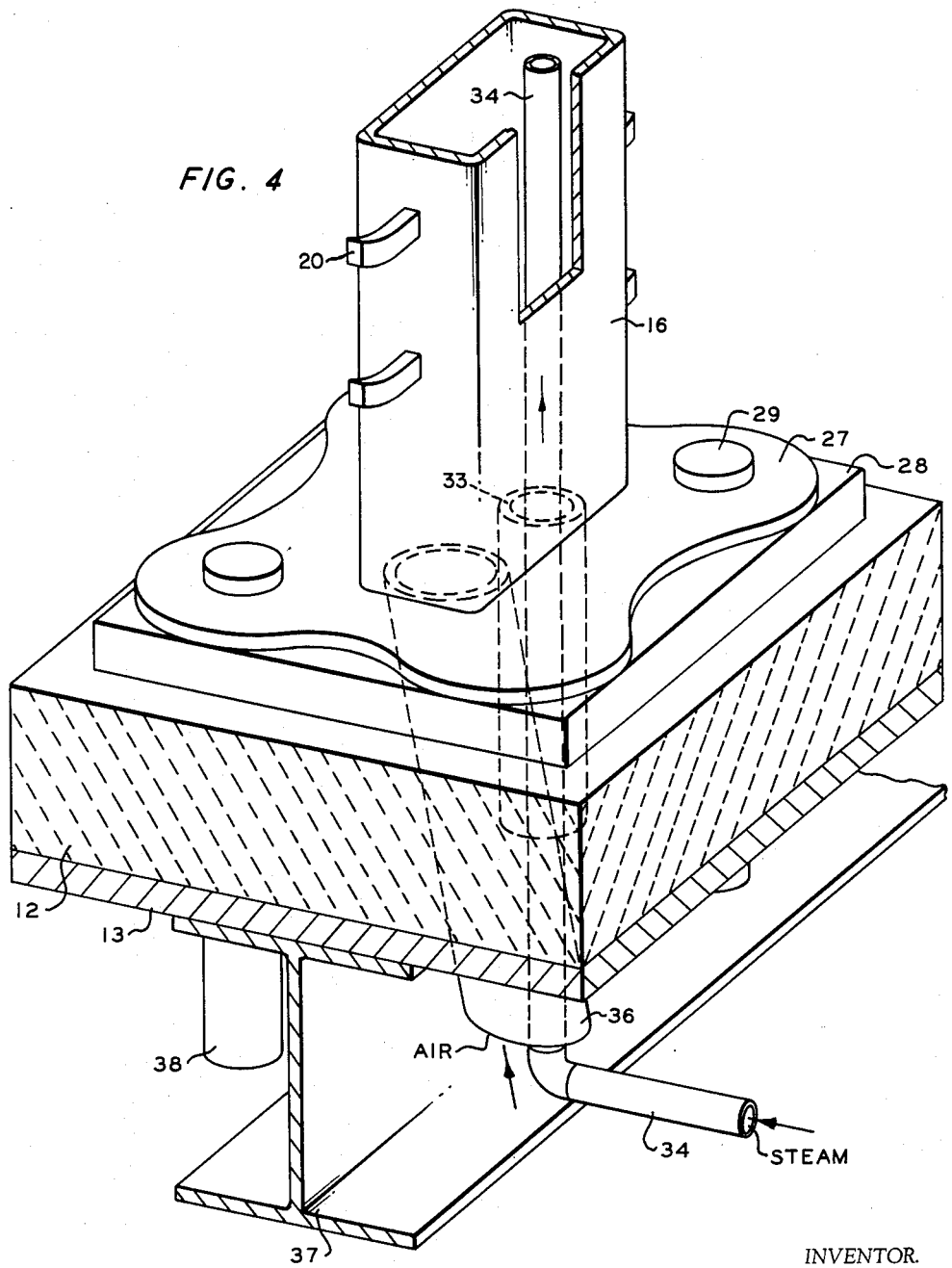

United States Patent Office 3,212,480
Patented Oct. 19, 1965

3,212,480
COOLING OF RADIANT FURNACE
TUBE SUPPORTS
Oliver M. Surber, Sweeny, Tex., assignor to Phillips
Petroleum Company, a corporation of Delaware
Filed June 10, 1963, Ser. No. 286,688
1 Claim. (Cl. 122—510)

This invention relates to the cooling of tube supports in a radiant furnace. In one aspect this invention relates to a novel method for cooling the tube supports in a radiant heat section of a high temperature furnace. In another aspect this invention relates to a means for providing a controlled amount of cooling to the tube supports in the radiant section of a high temperature furnace.

Radiant-type furnaces have come into wide use recently in the heating of fluids by indirect heat exchange. A radiant-type furnace is usually exemplified by a gradation heater wherein fluids are preheated in the convection section of the furnace and are then further heated in the radiant section of the furnace. Such heaters are in commercial use in the heating and cracking of hydrocarbons to more valuable products as well as in other heating applications. An important application of the radiant furnace is in the cracking of light hydrocarbons to ethylene.

In a radiant furnace radiant heating elements, such as gas-fired radiant burners, are usually positioned in opposite upright horizontally elongated walls of the furnace enclosing the radiant heating section. Elongated heating tubes are positioned horizontally in two upright planes parallel with the walls of the furnace containing the heating elements. These heating tubes are spaced apart in each plane and the tubes in each plane are opposite the spaces in the other plane so that the radiant burners positioned in the walls provide line-of-sight from the heaters to the near sides of the tubes in each row. Thus both sides of each tube are subjected to radiant heat. These heating tubes receive the fluent material to be heated and define a serpentine path through which the material flows. The tubes are supported on metal support posts, usually by resting on arms or pegs extending from the posts so that the tubes are free to move longitudinally as required by thermal expansion and contraction of the tubes occasioned by the very high temperatures which obtain in such furnaces. The furnace supports are tubular in construction and usually support the tubes in the convection section above the radiant section as well as the tubes in the radiant section. Although these supports are made of temperature resistant alloys, such as stainless steel containing 25 percent nickel and 20 percent chromium, the high temperatures attained in the radiant section of the furnace weaken the material sufficiently to cause the supports to distort under the tube coil load. Furnace temperatures of about 1800° F. are often used in the radiant section, for example, in the cracking of light hydrocarbons to produce ethylene. The structural strength of tube supports such as the above-referred-to stainless steel at 1800° F. firebox temperature is only about one-half the structural strength of such stainless steel at 1600° F. firebox temperature. The temperature of the tube supports approaches closely that of the firebox. It has been proposed to cool the tube supports with water or with air; however, these proposals have not been successful because water cannot be used at these high temperatures because of the danger of thermal shock to the tube supports and air has not lowered the temperature of the tube supports appreciably.

I have discovered that a combination of steam and air introduced into the bottom of the hollow pipe or tube support columns can be utilized to reduce the temperature of the supports sufficiently to maintain the structural strength of the supports at a desired level with no appreciable cooling of the tubes supported on the support column. After performing the function of cooling the pipe supports the steam and air pass into and mingle with the combustion gases in the upper part of the furnace, thus reducing the temperature of the stack gases.

It is an object of this invention to provide a method for cooling the tube supports in a radiant furnace. It is also an object of this invention to provide an apparatus for cooling the tube supports in a radiant furnace. The provision of a method and means for supplying the combined cooling effects of steam and air in the cooling of the tube supports in a radiant furnace is a further object of this invention. It is still another object of this invention to utilize the steam and air after cooling the tube supports for diluting the combustion gases leaving the convection section of the furnace. Other objects and advantages and features of the invention will be obvious to one skilled in the art upon studying the disclosure of the invention including the drawing wherein:

FIGURE 4 is a detail of the arrangement and construction of the cooling means for the tube support of FIGURE 2.

Figure 1:
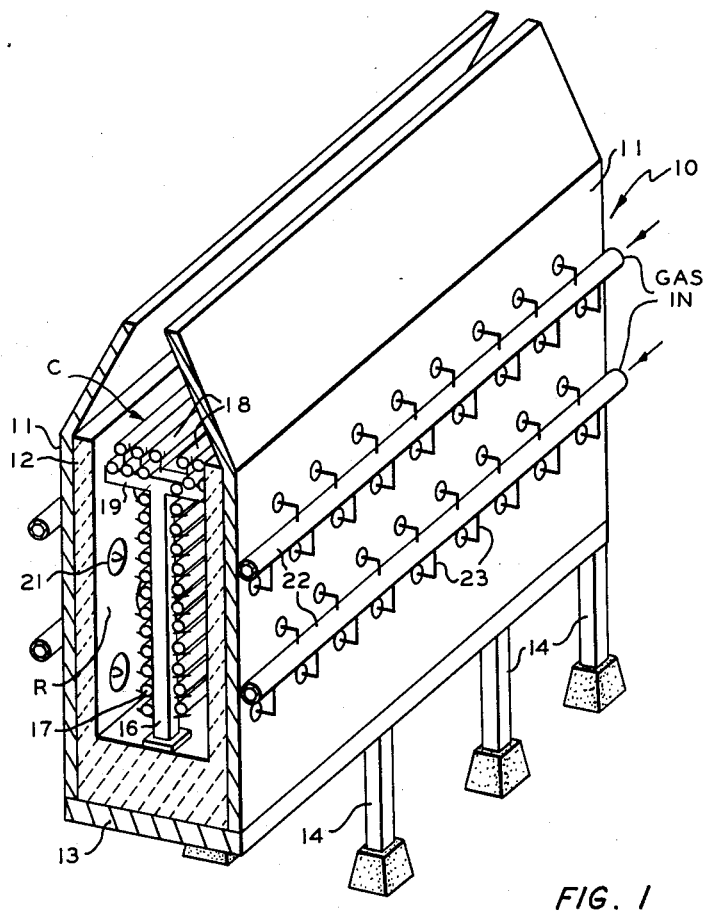
FIGURE 1 is a perspective view of a section of a radiant furnace.

A radiant furnace 10 is shown in FIGURE 1 comprising outer walls 11, covered on the inner surfaces with insulation 12, and supported by a floor 13 and legs 14. Tube support 16 is positioned in the furnace so as to support two parallel and vertical rows or banks of heat exchange tubes 17 in the radiant section R of the furnace and two rows or banks of parallel and horizontal tubes 18 on cross piece 19 in the convection section C of the furnace. The tube support 16 is open at the bottom and top. Cross piece 19 does not close the top of the tube support 16. Burners 21, positioned in the side walls of the radiant section of the furnace, are provided with fuel such as gas by means of manifold 22 and individual pipes 23 which lead from the manifold to the burners. Valves 24 in pipes 23 provide control for the burners 21. Combustion gases are discharged from the open top of the furnace 10.

Figure 2:
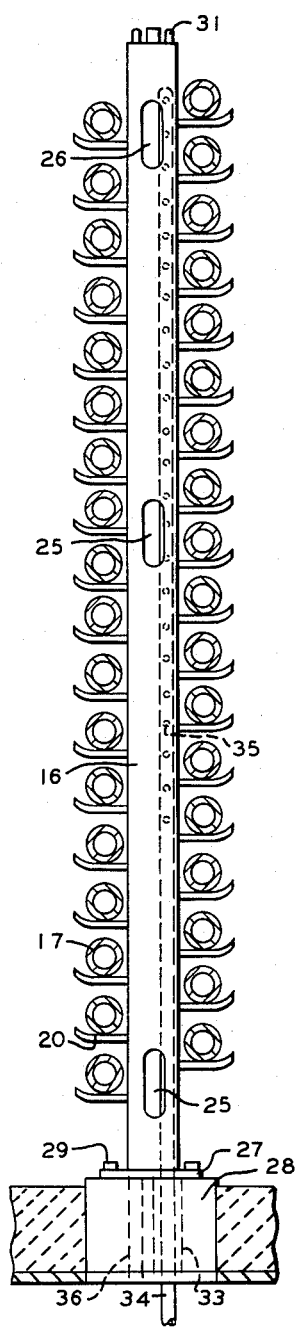
FIGURE 2 is an elevational view of a tube support according to the invention.

The pipe support 16 is shown in greater detail in FIGURE 2. The slots 25 are for the accommodation of bracing (not shown) employed between the various pipe supports 16. Slot 26 is left open for easy egress of steam from the interior of the pipe support 16. The pipe support 16 is secured to a base plate 27 which, in turn, is secured to a refractory block 28 by means of guide pins 29. The pipe support 16 is open at the top and terminates in guide pins or plates 31 for positioning cross piece 19 and yoke 32 while the yoke 32 is being welded to the pipe support 16. The arms 20 support the heat exchange pipes or tubes 17 slidably so that the pipes can expand and contract freely with temperature changes.

A sleeve 33 is positioned in the refractory block 28 so as to allow free passage therethrough of steam pipe 34 which extends nearly to the top of the pipe support 16 and contains openings 35 in about the upper two-thirds portion thereof for passage therethrough of steam introduced to steam pipe 34. A metal sleeve conduit 36 also extends through the refractory block 28 for passage of air into the bottom end of pipe support 16.

Figure 3:
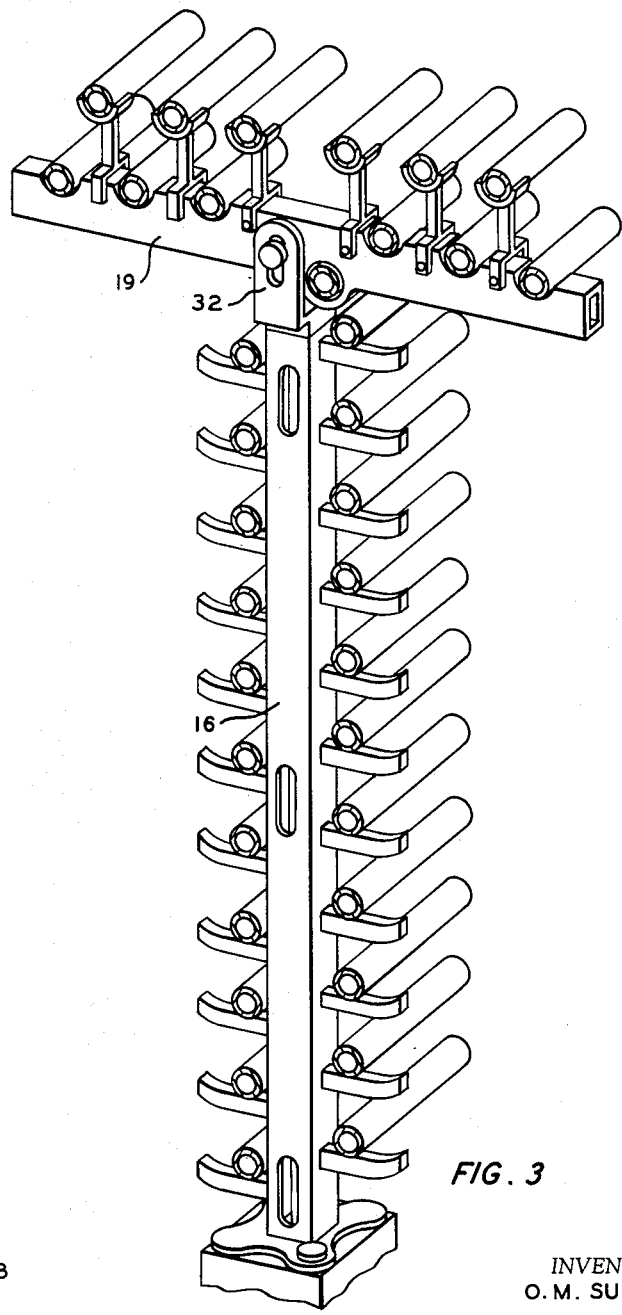
FIGURE 3 is a perspective view of a tube support showing the arrangement and construction for cooling the tube support according to the invention.

The relationship of the cross piece 19 to the tube support 16 is shown in FIGURE 3. The yoke 32 is preferably welded to the top of the tube support 16 and the cross piece 19 is secured in the yoke by bolts as shown in FIGURE 3.

In FIGURE 4 is shown the detail of an installation wherein I-beams 37 support the floor 13 so that air conduit 36 is placed in the refractory block 28 at an angle so as to avoid I-beams 37. The guide pins 29 rest freely in sleeves 38 which are positioned in the refractory block 28. The refractory block 28 is made by cutting a hole through the insulation 12 the size of the block 28 and then cutting holes through the floor plate 13 to accommodate the air conduit 36, the guide pin sleeves 38 and the steam pipe sleeve 33. When these sleeves or conduits are positioned in place, the hole is filled with a hydraulic insulating concrete mixture to form the refractory block 28.

In a typical tube furnace the vertical tube supports were about 10′ high and were about 2½″ x 4¾″ in cross-section. Each steam pipe sleeve was a 1-foot section of ¾″ schedule 80 pipe and each steam pipe was ⅜″ type 304 stainless tubing and was about 11′ in length, or height, including a portion extending through the insulation and floor member. The steam pipe terminated in a closed end a short distance below the cross-piece 19. The upper 4½′ of steam tube was drilled with ⅛″ holes on 6″ centers in some of the supports and the entire length of the steam tube above the furnace floor was drilled with ⅛″ holes on 6″ centers in the remaining supports. Steam was supplied by a 40 p.s.i. steam manifold outside the furnace.

All of the supports withstood the firebox temperature of 1800° F. with no warping or other ill effects as a result of the high temperature. In the same furnace operating at 1800° F. prior to the combined introduction of air and steam, the tube supports warped so badly that it was necessary to shut down the furnace periodically and replace the supports. It is necessary to operate the furnace at this high temperature to crack light hydrocarbons to produce ethylene. It presently appears that the supports will last indefinitely at firebox temperature, 1800° F., if cooled by steam and air according to the invention.

It is believed that the steam educes a flow of air along with the steam so that the cooling by the steam is greatly augmented by the increased flow of air. The use of air alone, by convection, did not alleviate the warping of the pipe or tube supports.

That which is claimed is:

In a radiant furnace adapted to operate at a firebox temperature of about 1800° F., having means to support a bank of horizontally positioned heat exchange tubes in said furnace comprising an open-ended stainless steel tubular member vertically supported on a refractory block on the furnace floor and a plurality of laterally positioned arms extending from said tubular member to support said horizontally positioned tubes, the combination therewith of an air inlet conduit extending through the furnace floor and refractory block in communication with the interior of said tubular member and the exterior of the furnace; a sleeve conduit extending through the furnace floor and refractory block in communication with the interior of said tubular member and the exterior of the furnace; a stainless steel steam pipe extending upwardly through said sleeve conduit and terminating in a closed end below the open top end of said tubular member; a plurality of steam passageways through the wall of the upper portion of said steam pipe; and means exterior of said furnace to supply steam to said steam pipe.

References Cited by the Examiner
UNITED STATES PATENTS

| | | | |
|---|---|---|---|
| 1,622,303 | 3/27 | Wyld et al. | 122—510 X |
| 2,079,191 | 5/37 | Thomas | 122—510 X |
| 2,270,863 | 1/42 | Barnes | 122—510 |
| 2,348,181 | 5/44 | Praeger | 122—510 X |
| 2,355,800 | 8/44 | Hensel | 122—510 X |
| 2,355,892 | 8/44 | Praeger | 122—510 |
| 2,716,968 | 9/55 | Hess et al. | 122—510 |

PERCY L. PATRICK, *Primary Examiner.*

MEYER PERLIN, *Examiner.*